Figure 1:
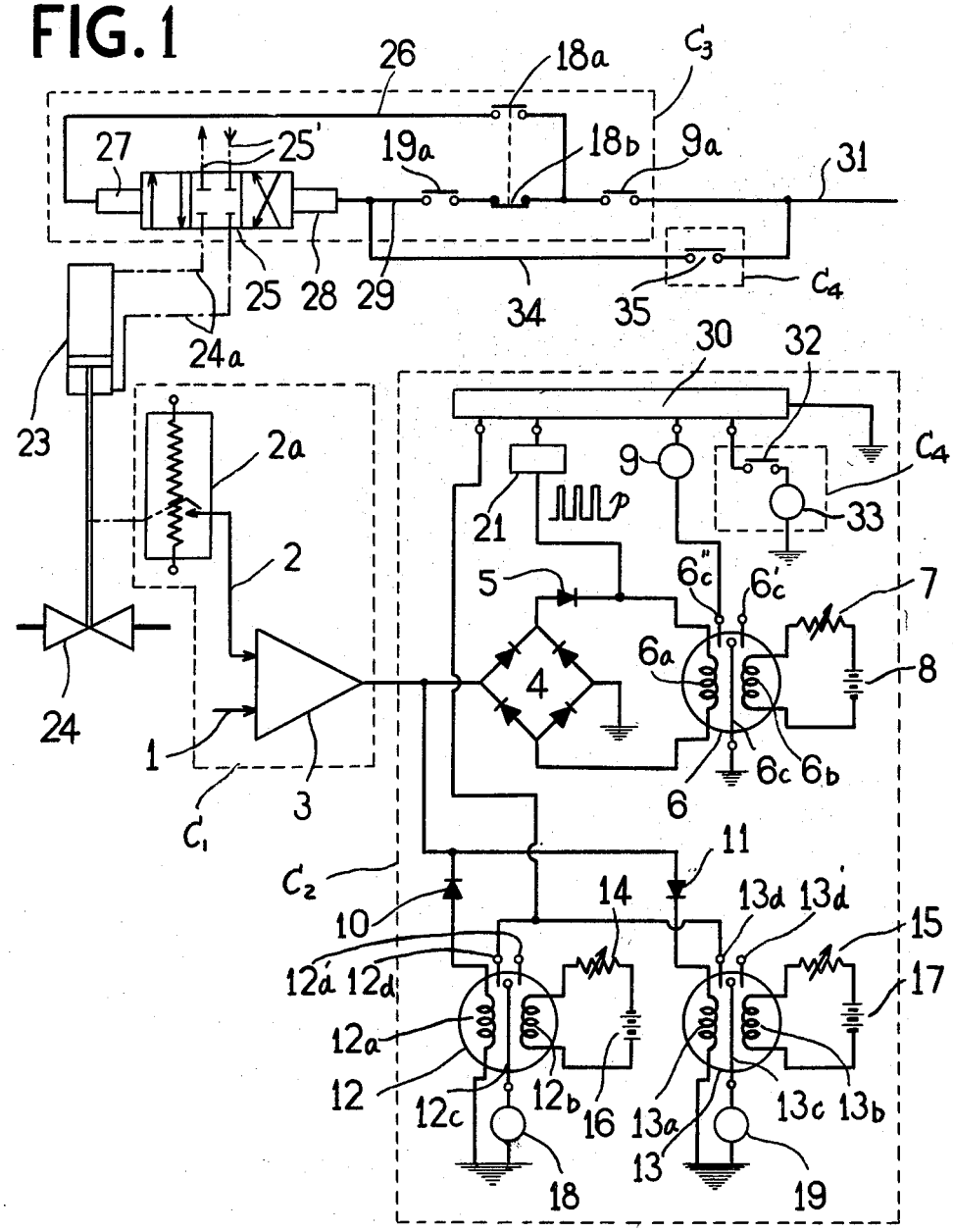

United States Patent

Kosugi et al.

[15] 3,664,358
[45] May 23, 1972

[54] METHOD OF AUTOMATIC VALVE CONTROL

[72] Inventors: Takeshi Kosugi, Nara; Toshio Kunimitsu, Hirakata, both of Japan

[73] Assignee: Nakakita Seisakusho Company Limited, Osaka, Japan

[22] Filed: Sept. 28, 1970

[21] Appl. No.: 75,865

[30] Foreign Application Priority Data

Oct. 2, 1969 Japan....................................44/78729

[52] U.S. Cl...................................137/14, 251/30, 251/131
[51] Int. Cl.....................................F16k 31/02, G05d 16/00
[58] Field of Search..........................137/85, 487.5, 1, 14, 8; 251/131, 30

[56] References Cited

UNITED STATES PATENTS 3,307,824  4/1967  Weisheit.............................251/131

*Primary Examiner*—Alan Cohan
*Attorney*—Moonray Kojima

[57] ABSTRACT

Controlling a valve automatically by electric feedback with a differential signal produced from a signal for desired valve position and a signal for actual valve position in such a manner that the valve is opened or closed continuously while the actual valve position is considerably far from the desired valve position, is opened or closed intermittently while the actual valve position is not so considerably far but insufficiently approximate to the desired valve position, and remains as it is when the actual valve position is sufficiently approximate to the desired valve position, and, in addition, that the valve is tightened sufficiently in the full closing position.

2 Claims, 4 Drawing Figures

INVENTOR
TAKESHI KOSUGI
TOSHIO KUNIMITSU
BY
ATTORNEY

METHOD OF AUTOMATIC VALVE CONTROL

The present invention relates to an improved method of automatic valve control, and in its more particular aspects it has to do with the application of this method to controlling electrically a valve of the kind to be opened and closed in connection with a hydraulic or pneumatic system to regulate the flow rate through the same valve.

The general method of the invention is an automatic controlling one of electric feedback type in which a differential signal produced from a signal for desired valve position and a signal for actual valve position is input into a control circuit, and then a hydraulic or pneumatic system in connection with the valve is controlled by the output of control circuit in such a manner as to open and close the valve continuously and/or intermittently until the differential signal approximates zero sufficiently, thereby making the signal for actual valve position sufficiently approximate to the signal for desired valve position and therefore making the actual valve position sufficiently approximate to the desired valve position.

A principal object of the invention is to control a valve automatically by electric feedback so as to open and close the valve in a substantially precise, speedy and assured manner.

A more specific object of the invention is to control a valve automatically in such a way as to open or close the valve continuously to a preliminary set range while the actual valve position is without the preliminary set range or in other words is considerably far from the desired valve position, open or close the valve intermittently to a final set range while the actual valve position is within the preliminary set range yet without the final set range or in other words is not so considerably far yet insufficiently approximate to the desired valve position, and have the valve remain as it is when the actual valve position is within the final set range or in other words is sufficiently approximate to the desired valve position, so that any substantial overshooting and the following transient deviation of actual valve position may be avoided in relation to the desired valve position.

Another specific object of the invention is to control a valve automatically in such a way as to continue to close the valve for a given time after it reaches the full closing position within the above-described final set range or in other words after the actual valve position is made sufficiently approximate to the desired valve position of zero percent opening, so that the valve may be tightened sufficiently when it is closed fully.

Figure 2:
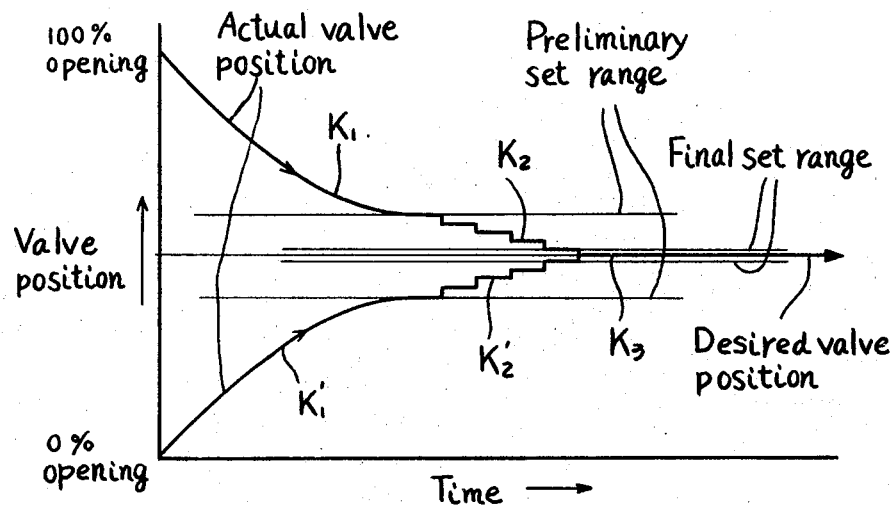
Figure 3:
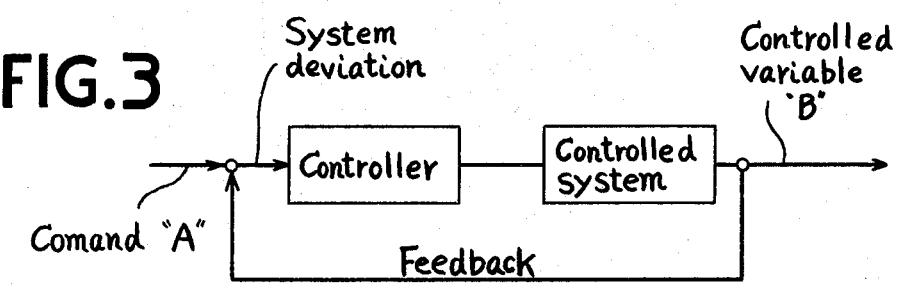
Figure 4:
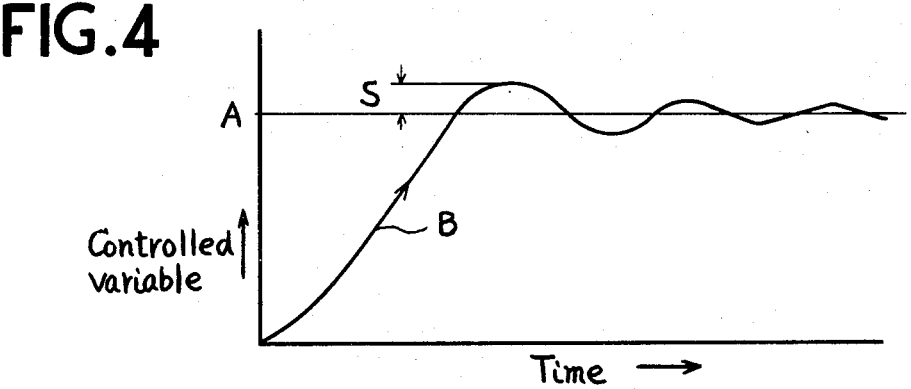

Other objects and various features of the invention will be more apparent from the following description when read in connection with the accompanying drawing, in which:

FIG. 1 is a circuit diagram of an automatic valve control system in which the method of the invention may be carried out, FIG. 2 graphically illustrates how the actual valve position comes to approximate the desired valve position in accordance with the invention, FIG. 3 is a block diagram of a feedback-type automatic control system in principle, and FIG. 4 graphically illustrates how the controlled variable comes to approximate the command by conventional methods of feedback-type automatic valve control.

Generally in the feedback-type automatic control system shown in FIG. 3, the system deviation of command "A" and controlled variable "B" is input into the controller, and the controlled system is so controlled by the output of controller that the system deviation may be reduced to naught, thereby making "B" equal to "A" automatically.

Based on the above-described principle of feedback-type automatic control, it is possible to control electrically a valve of the kind to be opened and closed in connection with a hydraulic or pneumatic system to regulate the flow rate through the same valve. The hydraulic or pneumatic system in connection with the valve may elementarily comprise a hydraulic or pneumatic source, a plunger or motor to drive the valve, and a piping intermediate the source and the plunger or motor. Practically in this case, the automatic valve control system will be such that the command is a signal for desired valve position, the controlled variable a signal for actual valve position, the controller one or more electric circuits, the controlled system a hydraulic or pneumatic system plus a valve to regulate a the flow rate through, and the system deviation a differential signal produced from the signal for desired valve position & the signal for actual valve position.

In such an automatic valve control system of electric feedback type the differential signal will be input into the electric circuit or circuits, and the hydraulic or pneumatic system in connection with the valve will be controlled by the output of electric circuit or circuits in such a way as to open and close the valve until the differential signal approximates zero, thereby making the signal for actual valve position approximate to the signal for desired valve position and therefore making the actual valve position approximate to the desired valve position.

By conventional methods of automatic valve control to be carried out in such an electric feedback-type system as described above, the actual valve position tends to overshoot the desired valve position substantially due to hydrodynamical characteristics of the hydraulic or pneumatic fluid to drive the valve, inertia of moving parts composing the hydraulic or pneumatic system and valve, pulsation of the fluid to be regulated through the valve, and other disturbing factors. In addition, a substantial overshoot will usually be followed by a substantial transient deviation which is often of fluctuating nature. In FIG. 4 illustrated is a typical course of the controlled variable "B" approximating the command "A" with a substantial overshoot "S" followed by a transient deviation of fluctuating nature. In some cases the transient deviation will be prolonged so much as to cause a substantial delay in getting the actual valve position to approximate to the desired valve position sufficiently, and even sometimes will last indefinitely so as to fail to get the actual valve position to approximate to the desired valve position at all.

It can therefore be said that a substantial overshoot and the following transient deviation prevents the valve from being controlled in a substantially precise, speedy and assured way in such an electric feedback-type automatic control system as described above. Such a substantial overshoot and transient deviation will be avoided and the valve will be controlled in a substantially precise, speedy and assured way in the same type of automatic valve control system in accordance with the invention, as described more fully in the following.

The method of the invention may practically be carried out for example in an automatic valve control system of electric feedback type shown in FIG. 1, where the controlled system consists of a hydraulic system and a valve to regulate the flow rate through while the controller primarily comprises three electric circuits.

Referring more particularly to FIG. 1, the valve is designated as 24 and in connection with the hydraulic system which is generally designated as 24a. The three electric circuits are generally designated as C1, C2 and C3, respectively. The circuit C1 is to input a differential signal which is produced from a signal for desired valve position and a signal for actual valve position. The circuit C2 is to control the opening and closing of valve electrically with the differential signal given from the input circuit C1. And the circuit C3 is to change-over the hydraulic system 24a to open and close the valve 24 with the output from the control circuit C2.

The hydraulic system 24a comprises a hydraulic source (not shown), a plunger 23 to drive the valve 24, pipes 25' intermediate the hydraulic source and the plunger and an electromagnetic valve 25 intercepting the pipes 25' to change over the pneumatic system to open and close the valve 24. The change-over valve 25 is provided with a pair of electromagnetic coils 27 and 28. The change-over valve 25 is put into a position to open the valve 24 when the coil 27 is excited, another position to close the valve 24 when the coil 28 is excited, and the other or neutral position neither to open nor close the valve 24 when neither of the coils 27 and 28 is excited.

The input circuit C1 comprises a line 1 to input a signal for desired valve position to be commanded from outside, a line 2 to feedback a signal for actual valve position, and a differential amplifier 3 to produce a differential signal from the signal for desired valve position and the signal for actual valve position. The feedback line 2 includes a valve positioner 2a in connection with the valve 24 to detect the actual valve position. The positioner 2a is connected to a power source (not shown). The differential amplifier 3 is connected to the control circuit C2 to input the differential signal.

Here the potential of signals for desired and actual valve position is such that it is in proportion to the position of valve 24, the max. potential corresponding to the 100 percent opening position of valve 24 and the min. potential corresponding to the zero percent opening position of same. The potential of differential signal is such that it is equal to the potential of signal for actual valve position minus the potential of signal for desired valve position; accordingly the differential signal is of positive polarity in case the potential of signal for actual valve position is more than the potential of signal for desired valve position in other words the valve 24 is actually opened more than desired or commanded, and of negative polarity in case the potential of signal for actual valve position is less than the potential of signal for desired valve position in other words the valve 24 is actually opened less than desired or commanded.

The control circuit C2 includes a rectifier 4 in connection with the differential amplifier 3 of input circuit C1, a balance relay 6 in connection with the rectifier 4 by the intermediary of a diode 5, a power source 8 in connection with the balance relay 6 by the intermediary of a resistance 7 to provide a given potential for a preliminary set range, a relay 9 in connection with the balance relay 6 to open and close a switch in the change-over circuit C3, a pulse oscillator 21 in connection with the balance relay 6 in parallel with the rectifier 4, a pair of balance relays 12 and 13 in connection with the differential amplifier 3 by the intermediary of diodes 10 and 11 respectively in parallel with the rectifier 4, a pair of power sources 16 and 17 in connection with the balance relays 12 and 13 by the intermediary of resistances 14 and 15 respectively to provide a given potential for a final set range, a pair of relays 18 and 19 in connection with the balance relays 12 and 13 to open and close switches in the change-over circuit C3 respectively, and a power source 30 in connection with the pulse oscillator 21 and the relays 9, 12 and 13.

The balance relay 6 is provided with a pair of coils 6a and 6b, a pair of fixed contacts 6c' and 6c'', and a movable contact 6c in an arrangement that the coil 6a and fixed contact 6c'' are in one side while the coil 6b and fixed contact 6c' are in the other side, the movable contact 6c being intermediate both sides and grounded. The coil 6a is connected to the rectifier 4 and the pulse oscillator 21, while the other coil 6b is connected to the power source 8 for preliminary set range. The fixed contact 6c'' in the coil 6a side is connected to the relay 9.

The potential of power source 8 defines the preliminary set range. Theoretically the potential of power source 8 can be given arbitrarily if only it falls within the variable range of the signal potential for actual valve position, that is, for 100 to 0 percent opening position of valve 24 to be detected in the valve positioner 2a. But practically for such a kind of electric circuits as shown in FIG. 1, the potential of power source 8 may usually be 3 to 5 percent the potential of signal for 100 percent opening of actual valve position.

The balance relay 13 is provided with a pair of coils 13a and 13b, a pair of fixed contacts 13d and 13d', and a movable contact 13c in an arrangement that the coil 13a and fixed contact 13d are in one side while the coil 13b and fixed contact 13d' are in the other side, the movable contact 13c being intermediate both sides and grounded. The coil 13a is connected to the differential amplifier 3 and grounded, while the other coil 13b is connected to the power source 17 for final set range. The fixed contact 13d in the coil 13a side is connected to the power source 30. The movable contact 13c is connected to the relay 19.

The potential of power source 17 defines the final set range. Theoretically the potential of power source 17 can be given arbitrarily if only it is less than the potential of power source 8 given as mentioned above. But practically for such a kind of electric circuits as shown in FIG. 1, the potential of power source 17 may usually be 0.5 to 1 percent the potential of signal for 100% opening of actual valve position to be detected in the valve positioner 2a.

The balance relay 12 is provided with a pair of coils 12a and 12b, a pair of fixed contacts 12d and 12d', and a movable contact 12c in the same arrangement as the balance relay 13, and these members are connected to the differential amplifier 3, power source 16 for final set range, relay 18 and power source 30 similarly to the balance relay 13. The potential of power source 16 is equal to that of power source 17, and also defines the final set range.

The balance relays 12 and 13 are in a parallel connection with each other. The diodes 10 and 11 are in a reversing direction with each other that the balance relay 13 may be actuated in case the differential signal from the input circuit C1 is of positive polarity while the balance relay 12 may be actuated in case the differential signal is of negative polarity.

The pulse oscillator 21 is arranged such that it may send out a pulse signal $p$ when the absolute potential of differential signal from the input circuit C1 is less than the potential of power source 8 for preliminary set range but more than the potential of power source 16 or 17 for final set range. Here the potential of pulse signal $p$ is more than the potential of power source 8.

The rectifier 4 and the power source 30 are grounded, respectively.

The change-over circuit C3 comprises a power source line 31 provided with a switch 9a and connected to a power source (not shown), a line 26 provided with a switch 18a and connected to the coil 27, and a line 29 provided with switches 18b and 19a and connected to the coil 28. The switch 9a is opened normally and closed when the relay 9 is actuated through the balance relay 6. The switch 19a is opened normally and closed when the relay 19 is actuated through the balance relay 13. The switch 18a is opened normally and closed when the relay 18 is actuated through the balance relay 12. The switch 18b is closed normally and opened when the relay 18 is actuated through the balance relay 12.

In the operation of the automatic valve control system shown in FIG. 1, initially the power sources 8, 16 and 17 are given suitable potentials for a preliminary and a final set range respectively, and all the power sources are put "ON". Then a signal for desired valve position is input from outside into the differential amplifier 3 through the command line 1, while a signal for actual valve position is automatically input from the valve positioner 2a into the differential amplifier 3 through the feedback line 2. The amplifier 3 produces a differential signal from the signal for desired valve position and the signal for actual valve position. The differential signal will be of positive polarity if the potential of signal for actual valve position is more than that for desired valve position, in other words, if the valve 24 is actually opened more than desired. The differential signal will be of negative polarity if the potential of signal for actual valve position is less than that for desired valve position, in other words, if the valve 24 is actually opened less than desired.

In case the differential signal is of positive polarity, the balance relay 6 is actuated with the differential signal input from the amplifier 3 through the rectifier 4 and diode 5, while the balance relay 13 is also actuated with the same differential signal through the diode 11. Suppose the actual valve position is without the preliminary set range in other words is so considerably far from the desired valve position as located on the K1 portion of curve in FIG. 2, the potential of signal for actual valve position is more than the potential of signal for desired valve position plus the potential of power source 8, and accordingly the potential of differential signal is more than the potential of power source 8.

As long as the potential of differential signal is more than the potential of power source 8, the coil 6a is more potential than the coil 6b and thereby the movable contact 6c is coupled with the fixed contact 6c'' in the balance relay 6 so that the relay 9 is actuated to close the switch 9a line in the line 31.

As long as the potential of differential signal is more than the potential of power source 17, the coil 13a is more potential than the coil 13b and thereby the movable contact 13c is coupled with the fixed contact 13d in the balance relay 13, so that the relay 19 is actuated to close the switch 19a in the line 29.

When the switches 9a and 19a are closed, the coil 28 is excited to put the change-over valve 25 into the position to close the valve 24 by the action of hydraulic plunger 23. In this condition, the valve 24 is closed continuously to the preliminary set range along the K1 portion of curve in FIG. 2. The more the actual valve position approximates the preliminary set range, the more the potential of signal for actual valve position approximates the potential of signal for desired valve position plus the potential of power source 8, and accordingly, the more the potential or differential signal approximates the potential of power source 8.

When the actual valve position reaches the preliminary set range, the potential of signal for actual valve position falls short of the potential of signal for desired valve position plus the potential of power source 8, and accordingly the potential of differential signal falls short of the potential of power source 8.

When the potential of differential signal is less than the potential of power source 8, the coil 6b will be more potential than the coil 6a and thereby the movable contact 6c will tend to get apart from the fixed contact 6c'' coupled with the other fixed contact 6c' in the balance relay 6. On this moment, however, the pulse oscillator 21 begins to send out a pulse signal $p$ the potential of which is more than the potential of power source 8. As the result, actually, the movable contact 6c touches the fixed contacts 6c' and 6c'' alternately with the same cycle as the pulse signal, so that the relay 9 is actuated to close the switch 9a in the line 31 intermittently.

As long as the switch 9a is closed intermittently with the switch 9a being closed continuously, the coil 28 is intermittently excited to put the change-over valve 25 into the closing position and the neutral position alternately. In this condition, the valve 24 is closed intermittently to the final set range along the K2 portion of curve in FIG. 2. The closing cycle of valve 25 is same as the pulse signal from oscillator 21. The more the actual valve position approximates the final set range, the more the potential of signal for actual valve position approximates the potential of signal for desired valve position plus the potential of power source 17, and accordingly, the more the potential of differential signal approximates the potential of power source 17.

When the actual valve position reaches the final set range, the potential of signal for actual valve position falls short of the potential of signal for desired valve position plus the potential of power source 17, and accordingly the potential of differential signal falls short of the potential of power source 17.

When the potential of differential signal is less than the potential of power source 17, the coil 13b is more potential than the coil 13a and thereby the movable contact 13c gets apart from the fixed contact 13d and coupled with the other fixed contact 13d' in the balance relay 13, so that the relay 19 is not actuated any more and therefore the switch 19a is opened in the line 29.

When the switch 19a is opened, the coil 28 is not excited any more and therefore the change-over valve 25 is returned into the neutral position neither to open nor close the valve 24 any more. In this condition, the valve 24 remains as it is within the final set range along the K3 portion of curve in FIG. 2. Now the potential of differential signal is sufficiently approximate to zero because it is less than the potential of power source 17 which is usually so small as 0.5 to 1 percent the potential of signal for 100 percent opening position of valve 24, and therefore the potential of signal for actual valve position is now sufficiently approximate to that for desired valve position. The valve 24 is not opened any further but remains sufficiently approximate to the desired valve position.

In case the differential signal is of negative polarity, the balance relay 12 is actuated with the differential signal from the amplifier 3 through the diode 10 in place of the balance relay 13. In this case, the balance relay 6 is actuated with the differential signal from the amplifier 3 through the rectifier 4 and diode 5 quite similarly to the case where the differential signal is of positive polarity.

The balance relay 6 works to close the switch 9a in the line 31 either continuously or intermittently in case of the negative differential signal quite similarly to the case of the positive differential signal. The balance relay 12 works similarly to the balance relay 13, except that the balance relay 12 actuates the relay 18 and thereby closes the switch 18a and opens the switch 18b to excite the coil 27 through the line 26 to put the change-over valve 25 into the position to open the valve 24 by the action of hydraulic plunger 23 instead that the balance relay 13 actuates the replay 19 and thereby closes the switch 19a to excite the coil 28 through the line 29 to put the change-over valve 25 into the position to close the valve 24. Thus, in case of the negative differential signal, 25 is opened continuously to the preliminary set range along the K1' portion of curve in FIG. 2, is opened intermittently to the final set range along the K2' portion of curve in FIG. 2, and remains as it is within the final set range along the K3 portion of curve in FIG. 2; all quite similarly to the case of the positive differential signal. Then the valve 24 is not closed any further but remains sufficiently approximate to the desired valve position.

Should the actual valve position get out of the final set range due to some disturbing factors for instance those mentioned precedingly after it once gets into the same range, the combination of balance relays 6 and 12 or 13 would automatically resume to work to open or close the valve 24 intermittently until the actual valve position is returned into the final set range. As the result, the actual valve position will always be kept within the final set range once it gets into the same range, which corresponds to $\pm 0.5$ to 1 percent the 100 percent opening position of valve; and this relatively quite small percentage of $\pm 0.5$ to 1 percent is the max. control error of the automatic valve control system in FIG. 1.

In either case where the differential signal is positive or negative, the valve 24 is opened or closed continuously toward the desired valve position while the actual valve position is considerably far from the desired valve position, is opened or closed intermittently toward the desired valve position while the actual valve position is not so considerably far yet insufficiently approximate to the desired valve position, and remains as it is when the actual valve position is sufficiently approximate to the desired valve position, as fully described above. Thus any substantial overshooting and the following transient deviation of actual valve position is avoided in relation to the desired valve position, and the actual valve position is kept sufficiently approximate to the desired valve position with relatively quite a small control error, and therefore the valve 24 is controlled automatically in a substantially precise, speedy and assured manner in accordance with the invention.

In case the valve 24 is closed fully as desired in the automatic control system shown in FIG. 1, it will be necessary to tighten the valve further from the condition where the actual valve position is made sufficiently approximate to the desired valve position of zero percent opening so that the possibility of leakage may be excluded. For this purpose, according to the invention, a time circuit generally designated as C4 may be provided in addition to the three circuits C1, C2 and C3 in the automatic valve control system shown in FIG. 1.

The time circuit C4 includes a timer 33 in connection with the power source 30 and grounded, a limit switch 32 intermediate the timer 33 and the power source 30, and a line 34 provided with a switch 35 and intercepting the power source (not shown), for line 31 and the coil 28 to be excited for closing the valve 24. The limit switch 32 is connected to the valve positioner 2a in such a way that the limit switch 32 may be opened normally and closed when the signal for actual valve position is sufficiently approximate to zero percent opening. The switch 35 is opened normally and closed for a given time through the timer 33 when actuated.

The moment the actual valve position is sufficiently approximate to zero percent opening, the valve positioner 2a sends out the signal for zero percent opening position of valve, and this signal closes the limit switch 32 to actuate the timer 33, which in turn closes the switch 35 for a given time in the line 34. As long as the switch 35 is closed, the coil 28 is excited to put the change-over valve 25 into the position to close the valve 24 by the action of hydraulic plunger 23, irrespective of the opening and closing of switches 9a and 19a through the relays 9 and 19, thus continuing to close the valve 25 further for a given time. A sufficiently given duration of timer 33 will result in sufficient tightening of the valve 24 after the actual valve position is made sufficiently approximate to the desired valve position of zero percent opening, and thereby excluding the possibility of leakage when the valve 24 is closed fully. And this adds to the assureness of automatic valve control in accordance with the invention.

It may be good to provide a hydraulic motor in place of the hydraulic plunger 23 in the automatic valve control system shown in FIG. 1.

It may also be good to employ a pneumatic system in place of the hydraulic system 24a in the automatic valve control system shown in FIG. 1. Either a pneumatic plunger or a pneumatic motor may be employed to drive the valve in the pneumatic system.

The electric circuits C1, C2, C3, and C4 may be of transistor-type one in place of the usual electric one shown in FIG. 1. The transistor-type circuits will make it possible to obtain a much smaller error of automatic control than the ones in FIG. 1.

Since certain changes and modifications may be made in the invention, some of which have been herein suggested, it is intended that the foregoing shall be construed in a descriptive rather than in a limiting sense.

What is claimed:

1. A method of electric feedback-type automatic control of a valve which is of the kind to be opened and closed in connection with a hydraulic or pneumatic system to regulate the flow rate through the same valve, comprising steps of producing a differential signal from a signal for desired valve position and a signal for actual valve position, opening or closing the valve continuously while the differential signal is without a preliminary set range, opening or closing the valve intermittently while the differential signal is within said preliminary set range yet without a final set range, and having the valve remain as it is when the differential signal is within said final set range; said differential signal being relatively far from zero without said preliminary set range, relatively not so far yet insufficiently approximate to zero within said preliminary set range yet without said final set range, and sufficiently approximate to zero within said final set range thereby making the signal for actual valve position sufficiently approximate to the signal for desired valve position and therefore having the actual valve position sufficiently approximate to the desired valve position.

2. A method of electric feedback-type automatic control of a valve which is of the kind to be opened and closed in connection with a hydraulic or pneumatic system to regulate the flow rate through the same valve in accordance with claim 1, further comprising a step of continuing to close the valve for a given time with the signal for actual valve position when the actual valve position is sufficiently approximate to full closing.

* * * * *